US012590585B2

(12) United States Patent
Coates et al.

(10) Patent No.: US 12,590,585 B2
(45) Date of Patent: Mar. 31, 2026

(54) CARTRIDGE STYLE FRONT COVER AND COUPLING CAVITY SLEEVE FOR AUTOMOTIVE SUPERCHARGER

(71) Applicant: Eaton Intelligent Power Limited, Dublin (IE)

(72) Inventors: Michael E. Coates, Marshall, MI (US); Brandon J. Elliott, Ceresco, MI (US); Eric J. Locker, Kalamazoo, MI (US)

(73) Assignee: Eaton Intelligent Power Limited, Dublin (IE)

( * ) Notice: Subject to any disclaimer, the term of this patent is extended or adjusted under 35 U.S.C. 154(b) by 926 days.

(21) Appl. No.: 17/064,668

(22) Filed: Oct. 7, 2020

(65) Prior Publication Data

US 2021/0017991 A1 Jan. 21, 2021

Related U.S. Application Data

(62) Division of application No. 15/424,145, filed on Feb. 3, 2017, now Pat. No. 10,808,701.

(Continued)

(51) Int. Cl.

| | |
|---|---|
| ***F04C 29/00*** | (2006.01) |
| ***F02B 33/38*** | (2006.01) |
| ***F02B 39/04*** | (2006.01) |
| ***F02B 67/10*** | (2006.01) |
| ***F04C 18/12*** | (2006.01) |
| ***F04C 23/00*** | (2006.01) |

(52) U.S. Cl.

CPC ............ *F04C 29/005* (2013.01); *F02B 33/38* (2013.01); *F02B 39/04* (2013.01); *F02B 67/10* (2013.01); *F04C 18/126* (2013.01); *F04C 23/006* (2013.01); *F04C 29/0085* (2013.01); *F04C 2240/30* (2013.01)

(58) Field of Classification Search

USPC ................. 417/355, 364; 464/70, 72, 75, 79

See application file for complete search history.

(56) References Cited

U.S. PATENT DOCUMENTS 1,192,342 A * 7/1916 Pelton ..................... F16D 3/843 403/23
1,636,293 A * 7/1927 Davey ....................... F16D 3/79 464/99

(Continued)

FOREIGN PATENT DOCUMENTS

EP 0344945 A3 5/1990
GB 1500623 A 2/1978

(Continued)

OTHER PUBLICATIONS

Definition of Receive (Obtained from https://www.merriam-webster.com/dictionary/receive on Dec. 23, 2024) (Year: 2024).*

(Continued)

*Primary Examiner* — Dominick L Plakkoottam
*Assistant Examiner* — Geoffrey S Lee
(74) *Attorney, Agent, or Firm* — Merchant & Gould P.C.

(57) ABSTRACT

A supercharger includes a main housing, a front cover coupled to the main housing and having an inner portion received within the main housing, a drive coupling assembly arranged between an input shaft and a rotor shaft, and a coupling sleeve disposed about the drive coupling.

17 Claims, 5 Drawing Sheets

Related U.S. Application Data

(60) Provisional application No. 62/305,559, filed on Mar. 9, 2016, provisional application No. 62/291,286, filed on Feb. 4, 2016.

(56) References Cited

U.S. PATENT DOCUMENTS 2,287,391 A 6/1942 Musselman
2,463,080 A 3/1949 Beier
2,595,393 A * 5/1952 Langdon .................. F16D 3/48 464/7
2,654,530 A 10/1953 Sidney
2,727,369 A * 12/1955 Fawick .................... F16D 3/50 464/7
2,879,650 A * 3/1959 Martin ..................... F16D 3/78 464/72
2,963,006 A * 12/1960 Karde .................... F02B 33/00 123/195 A
2,998,717 A 9/1961 Schwenk
3,135,071 A * 6/1964 Godar ................ B24B 27/0092 451/340
3,195,324 A 7/1965 Sellwood et al.
3,241,396 A 3/1966 Magrum
3,304,743 A * 2/1967 Paulsen .................... F16D 3/70 464/72
3,308,637 A 3/1967 Hans
3,427,827 A 2/1969 Airheart
3,793,849 A 2/1974 Downey
D235,343 S 6/1975 Otto
4,075,991 A 2/1978 Melttig et al.
D255,353 S 6/1980 Ullrich
4,345,486 A * 8/1982 Olesen ................. F16H 15/503 475/189
4,428,738 A 1/1984 Loubier
4,556,373 A 12/1985 Soeters
4,609,335 A 9/1986 Utthoff
4,768,934 A 9/1988 Soeters
4,844,044 A * 7/1989 McGovern ............. F04C 29/06 464/57
4,924,839 A * 5/1990 Mueller ............... F04C 29/005 464/57
4,944,278 A 7/1990 Woodard
4,944,279 A 7/1990 Woodard
4,953,517 A 9/1990 McGovern et al.
5,078,583 A 1/1992 Hampton et al.
5,083,907 A 1/1992 Brownell
5,131,829 A 7/1992 Hampton
5,195,241 A 3/1993 Bradfield
5,195,475 A 3/1993 Murphy et al.
RE34,276 E * 6/1993 Glaser .................... F01D 25/16 417/407
5,281,116 A 1/1994 Gwin
5,415,509 A 5/1995 Martin et al.
5,544,626 A 8/1996 Diggs et al.
5,588,821 A * 12/1996 Kinoshita ........... F04C 15/0061 418/270
5,752,810 A * 5/1998 Hein .................. F04C 15/0061 417/319
5,893,355 A 4/1999 Glover et al.
5,910,049 A * 6/1999 DeWachter .............. F16D 3/74 464/80
5,966,791 A 10/1999 Morello et al.
6,253,747 B1 7/2001 Sell et al.
6,325,722 B1 * 12/2001 Ciotola .................... F16D 3/70 464/93
6,331,103 B1 12/2001 Teraoka
6,425,749 B1 7/2002 Lettner et al.
6,758,661 B1 7/2004 Thelen
6,837,195 B2 1/2005 Suwazono
6,884,050 B2 4/2005 Prior
6,994,531 B2 * 2/2006 Dairokuno ........... F04D 25/028 123/565
7,137,384 B1 11/2006 Kavadeles
7,604,467 B2 10/2009 Prior
7,621,263 B2 11/2009 Eybergen et al.
7,681,559 B2 3/2010 Pratley et al.
7,726,286 B2 6/2010 Gregory et al.
7,845,921 B2 12/2010 Prior
7,866,966 B2 1/2011 Swartzlander
7,934,581 B2 5/2011 Kim et al.
8,042,526 B2 10/2011 Suhocki et al.
8,042,674 B2 10/2011 Hegerath et al.
8,096,797 B2 1/2012 Kaplan et al.
8,152,489 B2 * 4/2012 Shimizu ................ F02B 39/005 417/405
8,419,399 B2 4/2013 Kaplan et al.
8,464,697 B2 6/2013 Ouwenga et al.
8,632,324 B2 1/2014 Swartlander
8,668,614 B2 3/2014 Sherrill et al.
8,813,492 B2 8/2014 Hansen et al.
D718,043 S 11/2014 Hamburger
8,932,033 B2 1/2015 Ouwenga et al.
9,027,528 B2 5/2015 Bittencourt
9,086,012 B2 * 7/2015 Creager .................. F02B 39/12
9,234,542 B2 * 1/2016 McKeirnan, Jr. ..... F16C 27/045
9,297,426 B2 * 3/2016 Graves ............... F16D 25/0638
D781,345 S 3/2017 Pratley
11,098,766 B2 * 8/2021 Pratley .................... F04C 29/06
2003/0084888 A1 5/2003 LeBold
2003/0121507 A1 * 7/2003 Hasegawa ............... F02B 33/34 123/559.3
2004/0208770 A1 10/2004 Prior
2005/0011502 A1 * 1/2005 Pratley .................... F02B 33/36 123/559.1
2006/0252555 A1 11/2006 Corey et al.
2006/0263230 A1 11/2006 Swartzlander
2007/0082744 A1 4/2007 Corey
2007/0107704 A1 5/2007 Billings et al.
2007/0186890 A1 8/2007 Zurface et al.
2007/0193015 A1 * 8/2007 Gilbert ...................... F16D 3/48 29/428
2008/0060622 A1 3/2008 Prior
2008/0060623 A1 3/2008 Prior
2008/0149059 A1 6/2008 Murphy et al.
2008/0149452 A1 * 6/2008 Pratley .................... F02B 33/38 123/559.1
2008/0175739 A1 7/2008 Prior
2008/0276756 A1 * 11/2008 Marumoto ........... G03G 15/161 399/167
2009/0004038 A1 1/2009 Prior et al.
2009/0062018 A1 * 3/2009 Suhocki .............. F04C 29/0035 418/206.1
2009/0211244 A1 8/2009 Wegner et al.
2009/0232689 A1 9/2009 Prior
2010/0031906 A1 2/2010 Cuatt et al.
2010/0086402 A1 4/2010 Ouwenga et al.
2011/0083432 A1 4/2011 Hansen et al.
2011/0150671 A1 6/2011 Ouwenga et al.
2011/0226208 A1 9/2011 Zurface et al.
2011/0226209 A1 9/2011 Zurface et al.
2013/0098727 A1 * 4/2013 Williams .............. F16D 41/206 192/56.2
2013/0160749 A1 * 6/2013 Creager .................. F02B 39/12 123/559.3
2014/0017101 A1 1/2014 Staley
2014/0193285 A1 7/2014 Swartzlander
2014/0209071 A1 7/2014 Reienas et al.
2014/0224230 A1 8/2014 Simons et al.
2014/0334959 A1 * 11/2014 Franke .................... F16D 7/025 418/206.7
2015/0047617 A1 2/2015 Benjey et al.
2015/0184586 A1 * 7/2015 Tanaka .................... F02B 39/04 123/559.1
2015/0260188 A1 * 9/2015 Witherspoon .......... F02B 39/04 418/206.1
2016/0003250 A1 1/2016 McWilliams et al.
2016/0032985 A1 * 2/2016 Witherspoon ............ F16D 3/68 464/72
2016/0230813 A1 8/2016 Griffiths et al.
2016/0237885 A1 8/2016 Fortini et al.
2016/0319733 A1 11/2016 Benjey et al.
2016/0356318 A1 * 12/2016 Pratley ...................... F16D 3/70

(56) References Cited

U.S. PATENT DOCUMENTS

| | | | | |
|---|---|---|---|---|
| 2017/0002872 | A1 | 1/2017 | Pratley | |
| 2017/0067464 | A1 | 3/2017 | Swartzlander | |
| 2017/0146012 | A1 | 5/2017 | Swartzlander et al. | |
| 2017/0157729 | A1 | 6/2017 | Muster et al. | |
| 2017/0227010 | A1* | 8/2017 | Coates | F04C 18/126 |
| 2017/0260981 | A1 | 9/2017 | Swartzlander | |
| 2021/0088121 | A1* | 3/2021 | Rong | F16H 57/0025 |

FOREIGN PATENT DOCUMENTS

| | | | |
|---|---|---|---|
| JP | H01280636 | A | 11/1989 |
| WO | 2008081284 | A1 | 7/2008 |
| WO | 2012020304 | A1 | 2/2012 |
| WO | 2013118360 | A1 | 8/2013 |

OTHER PUBLICATIONS

Definition of "receive" (Merriam-Webster.com Dictionary, Merriam-Webster, https://www.merriam-webster.com/dictionary/receive. Accessed Apr. 28, 2025) (Year: 2025).*

* cited by examiner

CARTRIDGE STYLE FRONT COVER AND COUPLING CAVITY SLEEVE FOR AUTOMOTIVE SUPERCHARGER

CROSS REFERENCE TO RELATED APPLICATIONS

This application is a division of U.S. patent application Ser. No. 15/424,145, filed Feb. 3, 2017, now U.S. Pat. No. 10,808,701; which claims the benefit of U.S. Patent Application No. 62/291,286 filed on Feb. 4, 2016 and U.S. Patent Application No. 62/305,559 filed on Mar. 9, 2016. The disclosures of these applications are hereby incorporated by reference in their entirety.

FIELD

The present disclosure relates generally to superchargers and, more particularly, to a front cover and coupling sleeve on a supercharger.

BACKGROUND

Rotary blowers of the type to which the present disclosure relates are referred to as "superchargers" because they effectively super charge the intake of the engine. One supercharger configuration is generally referred to as a Roots-type blower that transfers volumes of air from an inlet port to an outlet port. A Roots-type blower includes a pair of rotors which must be timed in relationship to each other, and therefore, are driven by meshed timing gears. Typically, a pulley and belt arrangement for a Roots blower supercharger is sized such that, at any given engine speed, the amount of air being transferred into the intake manifold is greater than the instantaneous displacement of the engine, thus increasing the air pressure within the intake manifold and increasing the power density of the engine. However, the size of some superchargers may be problematic when trying to incorporate into a smaller packaging space. Moreover, some supercharger structure may unintentionally affect air flow performance. Accordingly, it is desirable to provide a supercharger with improved packaging and air flow performance.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one aspect, a supercharger is provided. The example supercharger includes a main housing, a front cover coupled to the main housing and having an inner portion received within the main housing, a drive coupling assembly arranged between an input shaft and a rotor shaft, and a coupling sleeve disposed about the drive coupling.

In addition to the foregoing, the described supercharger may include one or more of the following features: wherein the coupling sleeve is coupled between the main housing and the front cover inner portion; wherein the coupling sleeve is generally cylindrical and includes a main body portion disposed between a first end and a second end; wherein the main housing defines a bore configured to receive the coupling sleeve first end; wherein the coupling sleeve second end receives the front cover inner portion therein; wherein the coupling sleeve first end is press-fit into the bore, and the coupling sleeve second end is press-fit onto the front cover inner portion; and wherein the front cover inner portion includes a radially outwardly extending flange configured to facilitate preventing axial movement of the coupling sleeve.

In addition to the foregoing, the described supercharger may include one or more of the following features: wherein the coupling sleeve first end includes a wall disposed between a rim and the main body portion; wherein the wall is disposed substantially perpendicular to the rim and the main body portion; and wherein the wall is sloped and disposed at a substantially non-orthogonal angle relative to the rim and the main body portion.

In addition to the foregoing, the described supercharger may include one or more of the following features: wherein the drive coupling assembly includes a first hub mounted for concurrent rotation with the input shaft, a second hub mounted for concurrent rotation with the rotor shaft, a first side coupling assembly having a first side coupling body and a first side elastomeric insert, the first side coupling assembly defining a first plurality of openings therein, and a second side coupling assembly having a second side coupling body and a second side elastomeric insert, the second side coupling assembly defining a second plurality of openings therein. A central hub is disposed intermediate the first and second side coupling assemblies, the central hub defining central hub bores therein. A plurality of coupler pins are received in the central hub bores and extend on one end into the first plurality of openings and on a second end into the second plurality of openings. The first and second side elastomeric inserts provide dampening between (i) the first side coupling body and the central hub and (ii) the second side coupling body and the central hub.

In addition to the foregoing, the described supercharger may include one or more of the following features: a bearing disposed within the front cover inner portion, the bearing configured to rotatably support the input shaft within the front cover; wherein the front cover further includes an outer portion disposed outside of the main housing; a second bearing that is disposed within the front cover outer portion, the second bearing configured to further rotatably support the input shaft within the front cover; a pulley disposed on the front cover outer portion, the pulley configured to be driven by an internal combustion engine; wherein the coupling sleeve encapsulates the drive coupling; wherein the front cover includes a flange abutting against an outer wall of the main housing; and wherein the flange is coupled to the main housing outer wall by a plurality of fasteners.

In yet another aspect, a method of assembling a supercharger is provided. The method includes providing a main housing having an internal cavity, inserting a rotor shaft into the main housing internal cavity, providing a front cover having an inner portion and an outer portion, and inserting an input shaft through the front cover. The method further includes inserting the front cover inner portion into the main housing internal cavity such that the outer portion remains outside of the main housing, coupling the input shaft to the rotor shaft for common rotation therewith, and disposing a coupling sleeve over the coupling between the input shaft and the rotor shaft. The coupling sleeve includes a first end coupled to the main housing and a second end coupled to the front cover inner portion.

BRIEF DESCRIPTION OF THE DRAWINGS

The present disclosure will become more fully understood from the detailed description and the accompanying drawings, wherein.

DETAILED DESCRIPTION

Figure 1:
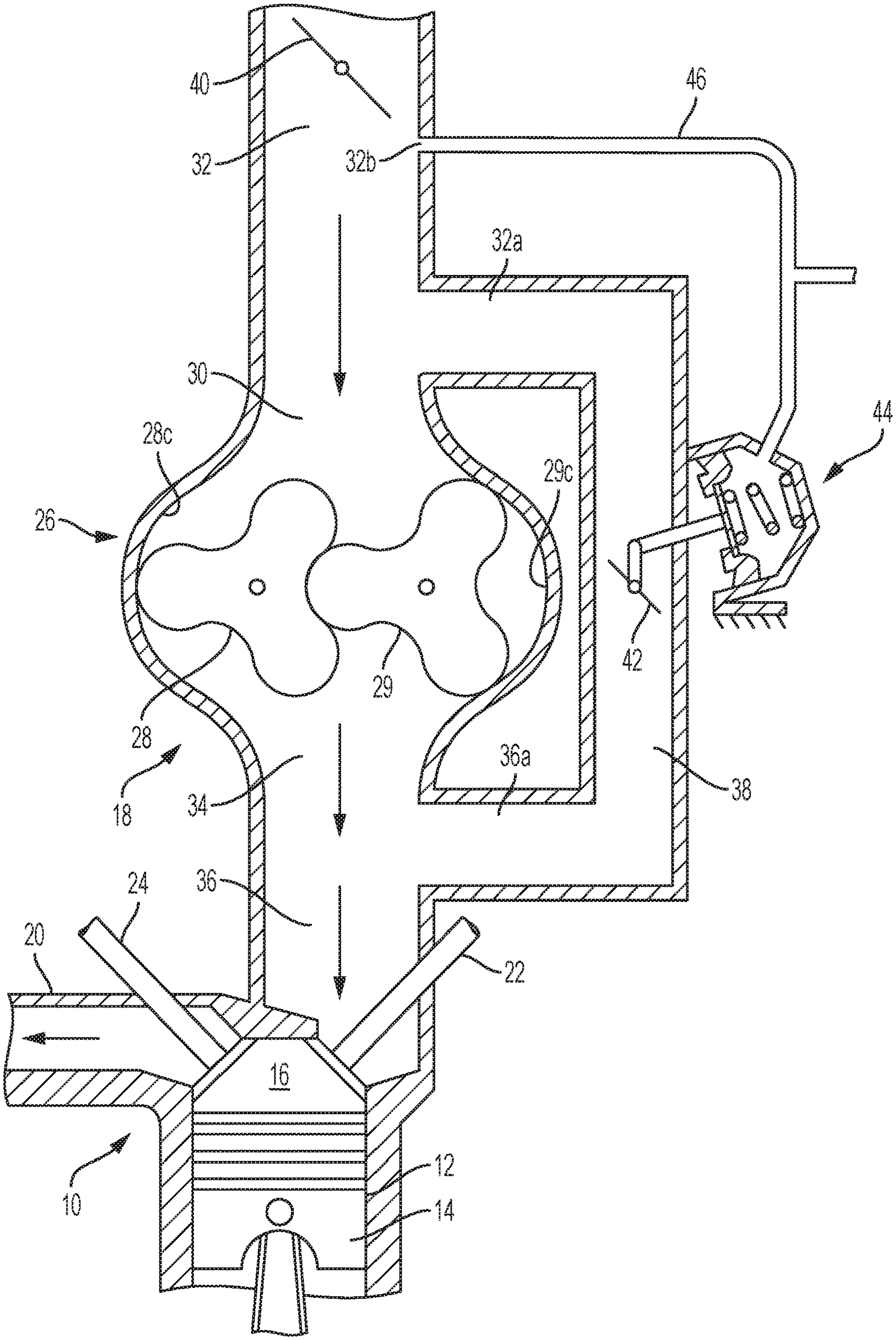
FIG. 1 is a schematic illustration of an intake manifold assembly having a positive displacement blower or supercharger constructed in accordance with one example of the present disclosure.

With initial reference to FIG. 1, a schematic illustration of an exemplary intake manifold assembly, including a Roots blower supercharger and bypass valve arrangement is shown. An engine 10 can include a plurality of cylinders 12, and a reciprocating piston 14 disposed within each cylinder and defining an expandable combustion chamber 16. The engine 10 can include intake and exhaust manifold assemblies 18 and 20, respectively, for directing combustion air to and from the combustion chamber 16, by way of intake and exhaust valves 22 and 24, respectively.

The intake manifold assembly 18 can include a positive displacement rotary blower or supercharger 26 of the Roots type. Further description of the rotary supercharger 26 may be found in commonly owned U.S. Pat. Nos. 5,078,583 and 5,893,355, which are expressly incorporated herein by reference.

Figure 2:
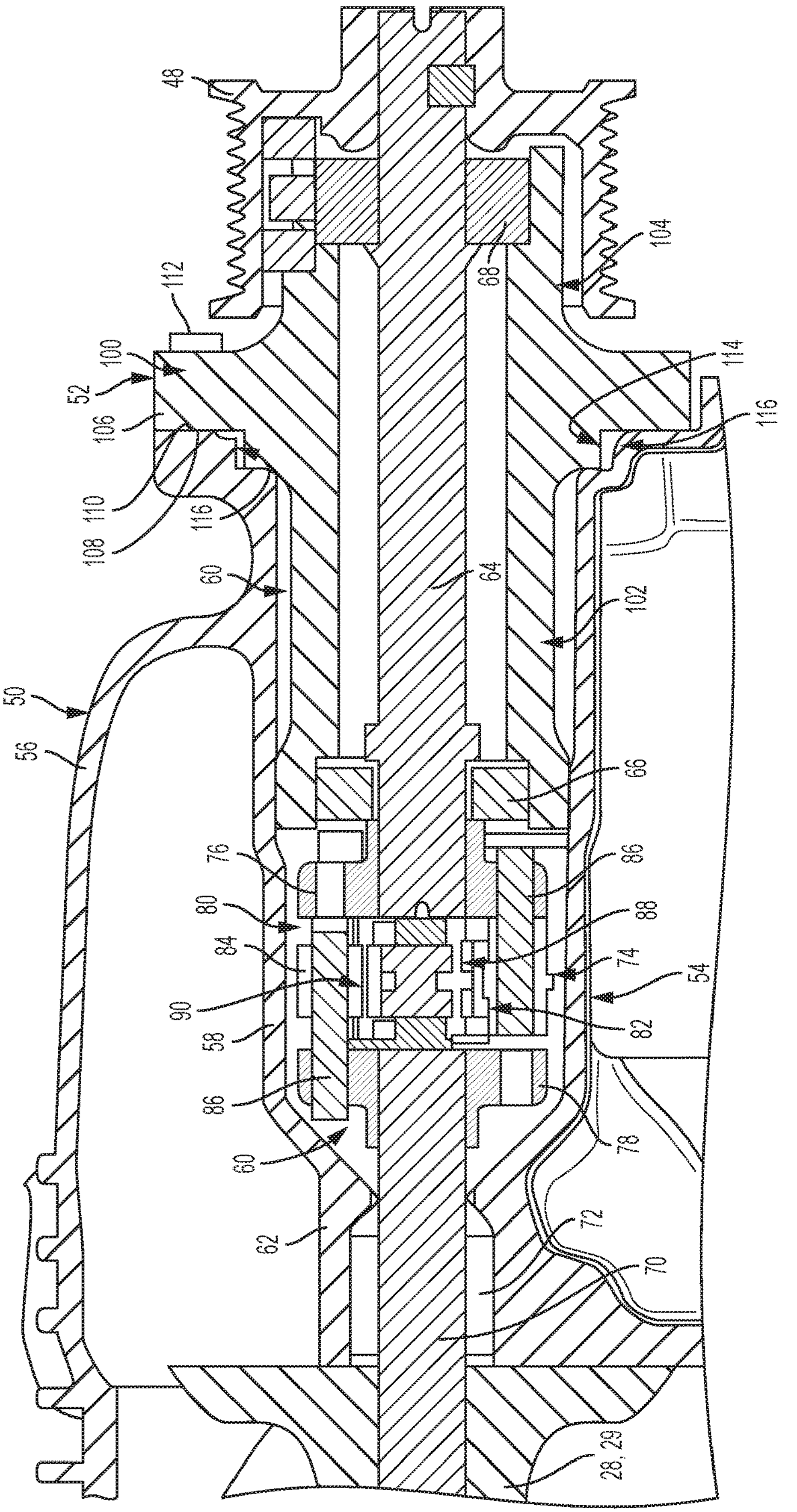
FIG. 2 is a cross-sectional view of a supercharger constructed in accordance with one example of the present disclosure.

With additional reference to FIG. 2, the supercharger 26 includes a pair of rotors 28 and 29, each of which includes a plurality of meshed lobes. The rotors 28 and 29 are disposed in a pair of parallel, transversely overlapping cylindrical chambers 28*c* and 29*c* (e.g., see FIG. 1), respectively. The rotors 28 and 29 may be driven mechanically by engine crankshaft torque transmitted thereto in a known manner, such as by a drive belt attached to a pulley 48 (FIG. 2). The mechanical drive rotates the blower rotors 28 and 29 at a fixed ratio, relative to crankshaft speed, such that the displacement of the supercharger 26 is greater than the engine displacement, thereby boosting or supercharging the air flowing to the combustion chambers 16.

With continued reference to FIG. 1, the supercharger 26 can include an inlet port 30 which receives air or air-fuel mixture from an inlet duct or passage 32, and further includes a discharge or outlet port 34, directing the charged air to the intake valves 22 by means of a duct 36. The inlet duct 32 and the discharge duct 36 are interconnected by means of a bypass passage, shown schematically at reference 38. If the engine 10 is of the Otto cycle type, a throttle valve 40 can control air or air-fuel mixture flowing into the intake duct 32 from a source, such as ambient or atmospheric air, in a well know manner. Alternatively, the throttle valve 40 may be disposed downstream of the supercharger 26.

A bypass valve 42 is disposed within the bypass passage 38. The bypass valve 42 can be moved between an open position and a closed position by means of an actuator assembly 44. The actuator assembly 44 can be responsive to fluid pressure in the inlet duct 32 by a vacuum line 46. The actuator assembly 44 is operative to control the supercharging pressure in the discharge duct 36 as a function of engine power demand. When the bypass valve 42 is in the fully open position, air pressure in the duct 36 is relatively low, but when the bypass valve 42 is fully closed, the air pressure in the duct 36 is relatively high. Typically, the actuator assembly 44 controls the position of the bypass valve 42 by means of a suitable linkage. The bypass valve 42 shown and described herein is merely exemplary and other configurations are contemplated. In this regard, a modular (integral) bypass, an electronically operated bypass, or no bypass may be used.

With specific reference to FIG. 2, in one implementation, supercharger 26 can generally include a main housing 50, a forward housing or front cover 52, and an input section 54. The main housing 50 includes an outer wall 56 and an inner wall 58, which at least partially defines a coupling isolator cavity or bore 60 configured to receive portions of the input section 54 such as front cover 52. In some embodiments, input section 54 can be cast in the main housing 50. The inlet port 30 can be at least partially defined between outer wall 56 and inner wall 58.

Input section 54 can include housing inner wall 58 connected to a housing member 62. The inner wall 58 can define bore 60, and housing member 62 can form a forward end of the chambers 28*c* and 29*c*. The front cover 52 can be at least partially received within bore 60 and can include an input shaft 64 disposed therein. The input shaft 64 can be rotatably supported within the front cover 52 by a first bearing 66 and a second bearing 68. A rotor shaft 70 can be mounted to the rotor 28 and rotatably supported within the housing member 62 by a rotor bearing 72.

A drive coupling assembly 74 can couple the input shaft 64 to the rotor shaft 70. In one example, a first hub 76 can couple the input shaft 64 to the coupling assembly 74 on a first end, and a second hub 78 can couple the rotor shaft 70 to the coupling assembly 74 on an opposite end. While not specifically shown, a first timing gear may be mounted on a forward end of the rotor shaft. The first timing gear may define teeth that are in meshed engagement with gear teeth of a second timing gear that is mounted on the second rotor shaft. The second rotor shaft would be in driving engagement with the rotor 29.

In one configuration, positive torque is transmitted from an internal combustion engine (of the periodic combustion type) to the pulley 48 and input shaft 64 by any suitable drive means, such as a belt and pulley drive system (not shown). Torque is transmitted from the input shaft 64 to the rotor shaft 70 through the coupling assembly 74. The coupling assembly 74 of the present disclosure provides torsional damping and can further account for misalignment between the input shaft 64 and the rotor shaft 70. When the engine 10 is driving the timing gears and the rotors 28 and 29, such is considered to be transmission of positive torque. On the other hand, whenever the momentum of the rotors 28 and 29 overruns the input from the input shaft 64, such is considered to be the transmission of negative torque.

The coupling assembly 74 can generally include a first side coupling assembly 80, a second side coupling assembly 82, a central hub 84, and a plurality of coupler pins 86. In some embodiments, as shown, the first side coupling assembly 80 can include a first side coupling body 88 and a first side elastomeric insert (not shown). The second side coupling assembly 82 can include a second side coupling body 90 and a second side elastomeric insert (not shown). In the example shown, the first and second coupling assemblies 80, 82 are constructed similarly, and all of the coupler pins 86 are also constructed similarly. However, the coupling assembly 74 can be a solid coupling or a series coupling.

With continued reference to FIG. 2, the main housing 50 and front cover 52, constructed in accordance to one example of the present disclosure, will be described in greater detail. Unlike typical front covers, which only extend outward from the main housing, the present front cover 52 is a cartridge style front cover configured to extend into the main housing 50. As such, front cover 52 can provide sufficient structural support for inputs (e.g., input shaft 64) when limited packaging space is available for the supercharger 26.

In the illustrated example, front cover 52 includes a connecting portion 100 disposed between an inner portion 102 and an outer portion 104. The connecting portion 100 can include a flange 106 defining a first shoulder or surface 108, which is configured to abut against a connecting surface 110 of the main housing 50. One or more fasteners such as bolt 112 can be inserted into apertures (not shown) formed in the flange 106 and the main housing connecting surface 110, to thereby couple the front cover 52 to the main housing 50. The connecting portion 100 can include a second shoulder or surface 114 configured to be received within a recess 116 formed in the main housing 50. The recess 116 can act as a piloting and locating feature for the front cover 52 to ensure alignment with the drive coupling assembly 74 to the rotors 28, 29, and to make it easier to insert and orient the front cover 52 within the main housing bore 60.

The front cover inner portion 102 extends from connecting portion 100 and is configured to be received within the main housing bore 60, which is at least partially defined by the housing inner wall 58. The front cover outer portion 104 extends from connecting portion 100 and is configured to receive the pulley 48 or other drive input from the engine 10. As such, the inner portion 102 of the front cover 52 extends into the main housing 50, which reduces the amount of structure of the front cover 52 that extends from the housing 50, thereby reducing the package space of supercharger 26. Further, portions of the front cover 52 proximate the bearing 66 can act as a pilot such that the front cover 52 pilots at both ends. In other embodiments, front cover 52 does not include a pilot proximate bearing 66.

Figure 3:
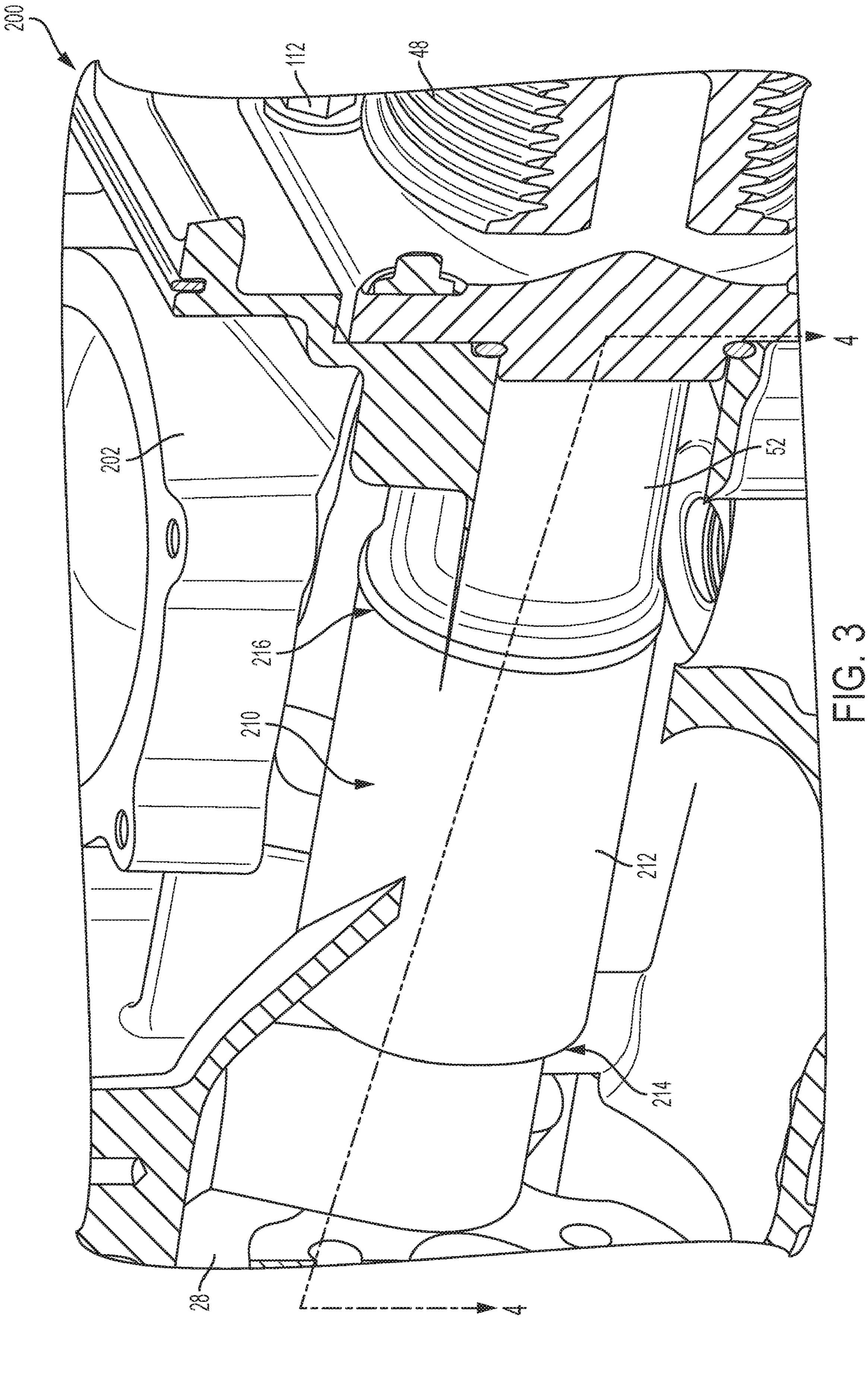
FIG. 3 is a sectional view of a portion of a supercharger constructed in accordance with another example of the present disclosure.
Figure 4:
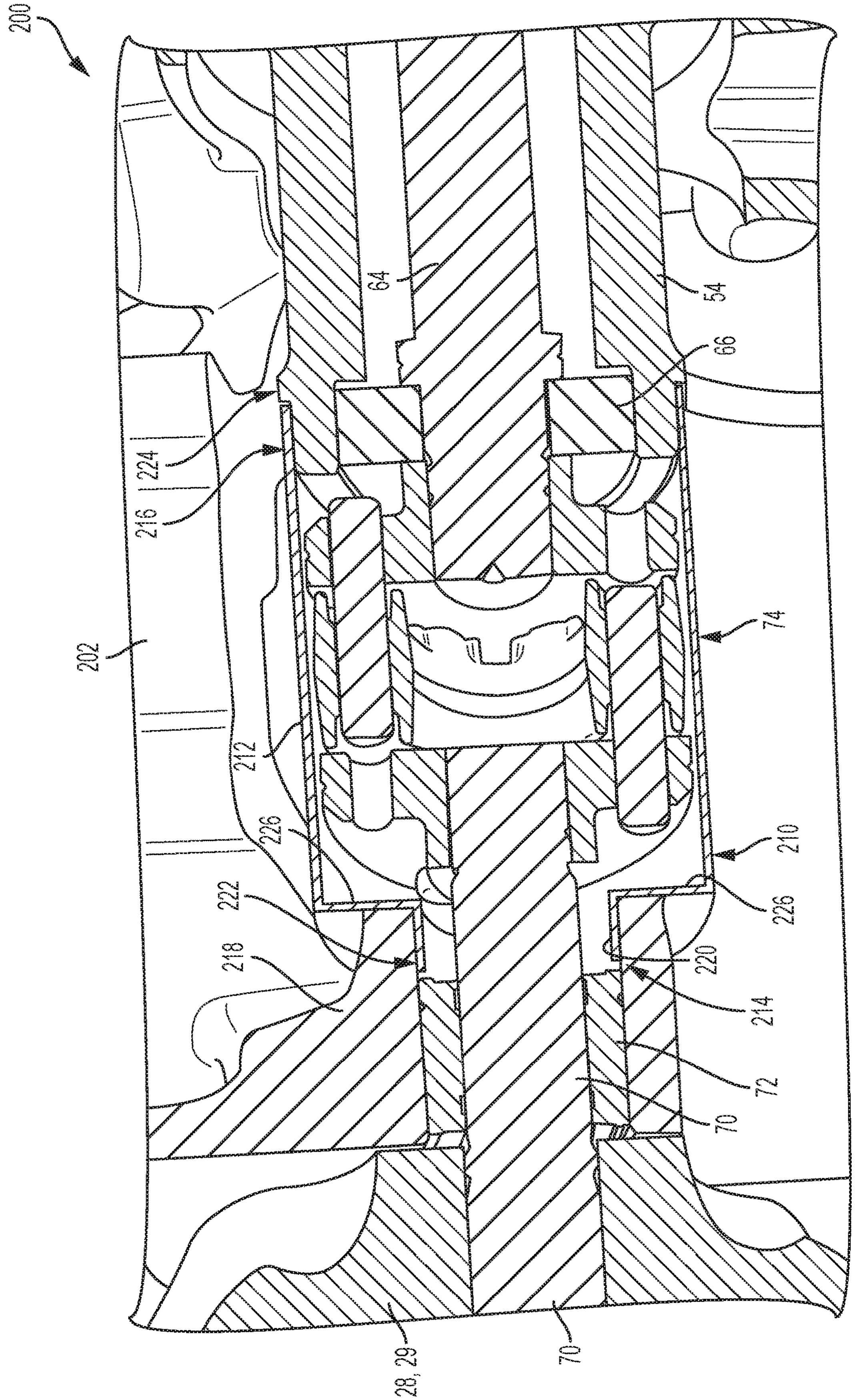
FIG. 4 is a cross-sectional view of the supercharger shown in FIG. 3 and taken along line 4-4.
Figure 5:
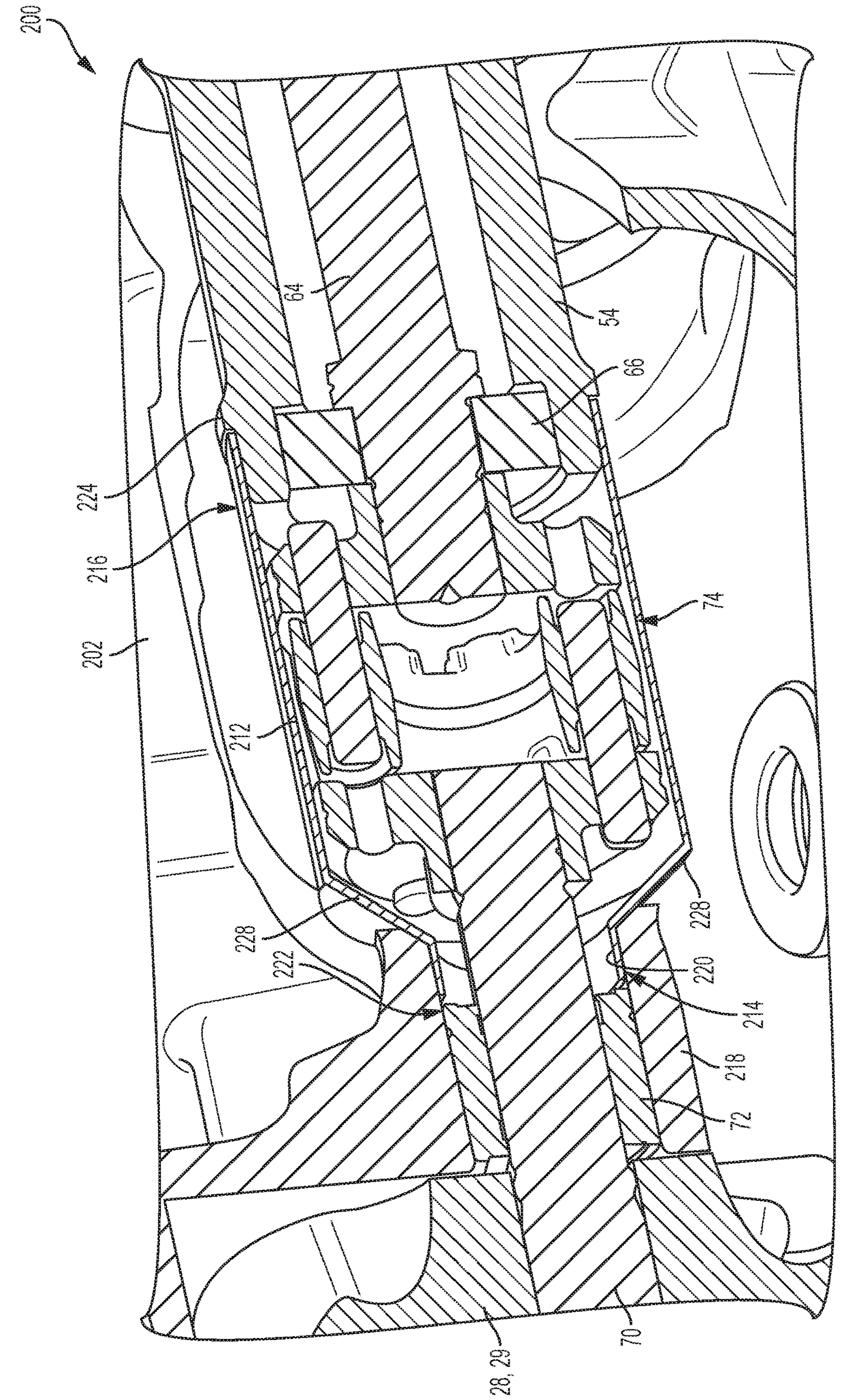
FIG. 5 is a cross-sectional view of a portion of a supercharger constructed in accordance with yet another example of the present disclosure.

With reference now to FIGS. 3-5, in which like reference numerals indicate like parts to those described in FIGS. 1 and 2, a supercharger 200 constructed in accordance to one example of the present disclosure will be described in greater detail. In the illustrated example, supercharger 200 is similar to supercharger 26, except supercharger 200 does not include a main housing inner wall 58, and instead includes a coupling sleeve 210.

As shown in FIGS. 3-5, supercharger 200 includes a main housing 202 that houses a coupling sleeve 210. In the illustrated example, coupling sleeve 210 is configured to enclose the coupling 74, rather than having a cast cavity or bore defined by a main housing inner wall (e.g., 58 in FIG. 2), which is typically a cast material used to enclose the coupling assembly 74. Thus, the internal wall 58 of the cavity 60 can be removed (or significantly reduced), thereby reducing the weight of the housing and freeing up space within the housing to allow increased airflow volume and improved flow performance.

In one example, the coupling sleeve 210 is generally cylindrical and includes a main body portion 212, a first end 214, and a second end 216. The coupling sleeve is assembled over the coupling assembly 74 by connecting the first end 214 to a housing member 218, and connecting the second end 216 to the front cover 52. In particular, the sleeve first end 214 includes a rim 220 configured to be received, for example by a press-fit, within a bore 222 defined by the housing member 218. The sleeve second end 216 is sized to fit about an end of the front cover 52, for example, by a press-fit. The front cover 52 can include a radially outwardly extending flange or shoulder 224 configured to contain the sleeve and prevent axial movement thereof.

The coupling sleeve 210 is configured to encapsulate the coupling assembly 74. The coupling sleeve 210 can have various shapes that enable it to better fit within main housing 202 or couple between housing member 218 and front cover 52. For example, as shown in FIG. 4, coupling sleeve first end 214 can include a straight wall 226 extending between the main body portion 212 and the rim 220. As shown in the illustrated example, straight wall 226 can be disposed perpendicular to or substantially perpendicular to rim 220 and main body portion 212. In another example shown in FIG. 5, coupling sleeve first end 214 can include an angled wall 228 extending between the main body portion 212 and the rim 220. As shown in the illustrated example, angled wall 228 is sloped between rim 220 and main body portion 212 (i.e., angled wall 228 is disposed at a non-orthogonal or substantially non-orthogonal angle relative to rim 220 and main body portion 212).

An example method of assembling supercharger 200 can include installing rotor shaft 70 in the housing 202 by inserting the rotor shaft 70 through the rotor bearing 72. The sleeve 210 can then be inserted over the rotor shaft 70 and connected to the housing member 218. A first portion of the coupling assembly 74 can be coupled to the rotor shaft 70. The front cover 52 is provided with the input shaft 64 disposed therein and a second portion of the coupling assembly 74 is then pressed onto the input shaft 64. A third portion of the coupling assembly 74 is connected to the second portion of the coupling assembly 74, and the front cover 52 is subsequently inserted into the housing until the third portion couples to the first portion of the coupling assembly 74.

Described herein are systems and methods for a supercharger system. The supercharger includes a main housing configured to internally receive a portion of a front cover, thereby reducing package space of the supercharger. The main housing can include features configured to pilot and orient the front cover during installation. Accordingly, the internally disposed front cover can allow for sufficient structural support for inputs for the supercharger when limited package space is available. Additionally, the main housing can remove or reduce an inner wall that is typically utilized to enclose a drive coupling. Instead, a coupling sleeve is disposed about the drive coupling between the inner housing and the front cover, thereby reducing cast material of the main housing and increasing and improving inlet airflow in the supercharger.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A supercharger comprising:

a main housing including an outer wall structure having an interior surface defining overlapping cylindrical chambers housing a pair of intermeshed rotors, the main housing further defining a first inner wall structure disposed within an internal cavity defined by the outer wall structure and radially inward from the interior surface, the internal cavity being in fluid communication with the overlapping cylindrical chambers;

a front cover separate from and coupled to the outer wall structure of the main housing, the front cover having an inner portion received within the internal cavity and having an outer portion external to the main housing, wherein an input shaft extends through an internal passageway defined by the front cover inner and outer portions;

a drive coupling assembly arranged within the internal cavity and between the input shaft and the at least one rotor shaft of the pair of intermeshed rotors, wherein the drive coupling assembly is disposed at least partially between the front cover and the at least one rotor shaft; and a coupling sleeve disposed about the drive coupling assembly, the coupling sleeve being entirely disposed within the internal cavity, wherein the coupling sleeve is non-rotatably coupled to the first inner wall structure of the main housing within the internal cavity and to the front cover inner portion that is received within the first inner wall structure of the main housing, wherein the coupling sleeve, the first inner wall structure, and the front cover define an isolator cavity that separates the input shaft and the drive coupling assembly within the internal cavity from the pair of intermeshed rotors within the overlapping cylindrical chambers.

2. The supercharger of claim 1, wherein the coupling sleeve is generally cylindrical and includes a main body portion disposed between a first end and a second end.

3. The supercharger of claim 2, wherein the main housing defines a bore configured to receive the coupling sleeve first end.

4. The supercharger of claim 3, wherein the coupling sleeve second end receives the front cover inner portion therein.

5. The supercharger of claim 4, wherein the coupling sleeve first end is press-fit into the bore, and the coupling sleeve second end is press-fit onto the front cover inner portion.

6. The supercharger of claim 4, wherein the front cover inner portion includes a radially outwardly extending flange configured to facilitate preventing axial movement of the coupling sleeve.

7. The supercharger of claim 2, wherein the coupling sleeve first end includes a wall disposed between a rim and the main body portion.

8. The supercharger of claim 7, wherein the wall is disposed substantially perpendicular to the rim and the main body portion.

9. The supercharger of claim 7, wherein the wall is sloped and disposed at a substantially non-orthogonal angle relative to the rim and the main body portion.

10. The supercharger of claim 1, wherein the drive coupling assembly comprises:

a first hub mounted for concurrent rotation with the input shaft;

a second hub mounted for concurrent rotation with the at least one rotor shaft;

a first side coupling assembly having a first side coupling body, the first side coupling assembly defining a first plurality of openings therein;

a second side coupling assembly having a second side coupling body, the second side coupling assembly defining a second plurality of openings therein;

a central hub disposed intermediate the first and second side coupling assemblies, the central hub defining central hub bores therein; and a plurality of coupler pins received in the central hub bores and extending on a first end into the first plurality of openings and on a second end into the second plurality of openings.

11. The supercharger of claim 1, further comprising a bearing disposed within the front cover inner portion, the bearing configured to rotatably support the input shaft within the front cover.

12. The supercharger of claim 11, further comprising a second bearing that is disposed within the front cover outer portion, the second bearing configured to further rotatably support the input shaft within the front cover.

13. The supercharger of claim 12, further comprising a pulley disposed on the front cover outer portion, the pulley configured to be driven by an internal combustion engine.

14. The supercharger of claim 1, wherein the coupling sleeve encapsulates the drive coupling assembly such that the pair of intermeshed rotors are separated from the drive coupling assembly.

15. The supercharger of claim 1, wherein the front cover includes a flange abutting against an outer wall of the main housing.

16. The supercharger of claim 15, wherein the flange is coupled to the outer wall structure by a plurality of fasteners.

17. A method of assembling a supercharger, comprising:

providing a main housing including an outer wall structure having an interior surface defining overlapping cylindrical chambers housing a pair of intermeshed rotors, the main housing further defining a first inner wall structure disposed within an internal cavity defined by the outer wall structure and radially inward from the interior surface, the internal cavity being in fluid communication with the overlapping cylindrical chambers;

inserting at least one rotor shaft into the internal cavity;

providing a front cover separate from and coupled to the outer wall structure of the main housing, the front cover having an inner portion received within the internal cavity and an outer portion external to the main housing;

inserting an input shaft through the front cover, wherein the input shaft extends through an internal passageway defined by the front cover inner and outer portions;

inserting the front cover inner portion into the internal cavity such that the outer portion remains outside of the main housing;

coupling the input shaft to the at least one rotor shaft for common rotation therewith; and disposing a non-rotating coupling sleeve over the coupling between the input shaft and the at least one rotor shaft of the pair of intermeshed rotors and entirely within the internal cavity, the coupling sleeve having a first end fixedly coupled to the first inner wall structure of the main housing and a second end fixedly coupled to the front cover inner portion that is received within the first inner wall structure of the main housing; wherein the coupling sleeve, the first inner wall structure, and the front cover define an isolator cavity that separates the input shaft and the coupling between the input shaft and the at least one rotor shaft within the internal cavity from the pair of intermeshed rotors within the overlapping cylindrical chambers.

* * * * *